Patented July 12, 1932

1,866,849

UNITED STATES PATENT OFFICE

ANTHONY GEORGE, OF NIAGARA FALLS, NEW YORK, ASSIGNOR, BY MESNE ASSIGNMENTS, TO MONSANTO CHEMICAL WORKS, OF ST. LOUIS, MISSOURI, A CORPORATION OF MISSOURI

MANUFACTURE OF BENZOIC ACID, METALLIC BENZOATES, AND ALKYL BENZOATES

No Drawing.   Application filed April 22, 1925.   Serial No. 25,132.

This invention relates to an improved method for producing benzoic acid and benzoates from benzotrichloride. In the improved process of the present invention, benzotrichloride is first converted to an alkyl benzoate which may then advantageously be employed for the production of benzoic acid and metallic benzoates. The invention includes improvements in the production of alkyl benzoates as well as in the production of benzoic acid and metallic benzoates.

It is well known that benzoic acid prepared by direct hydrolysis of benzotrichloride to the acid is contaminated with foul smelling impurities, necessitating an elaborate process of recrystallization and sublimation in order to obtain a product of the desired quality. By the present invention, I have provided a method whereby one readily obtains benzoic acid and metallic benzoates of high purity. According to my invention an alkyl benzoate is first prepared, which may be purified readily as by distillation, after which it is hydrolyzed to a metallic benzoate, which, if desired, may be converted further into benzoic acid by acidification. Both the metallic benzoate and benzoic acid, being derived from a purified alkyl benzoate, are products of high purity, and do not require the elaborate refining operations that are otherwise necessary.

Alkyl benzoates can be produced by alcoholysis of benzotrichloride, but in this reaction alcohol is used up in the formation of the benzoate radical, only about half of the alcohol appearing as the alkyl radical in the alkyl benzoate. I have found, however, that alkyl benzoates can be produced with a substantial saving in the amount of alcohol required by reacting upon benzotrichloride successively with water and alcohol.

In carrying out the present process, the initial water hydrolysis of the benzotrichloride may with advantage be effected in the presence of an anhydrous metallic catalyst in the manner described in my application filed July 22, 1924, Serial No. 727,412 now Patent No. 1,557,153 dated October 13, 1925. Zinc chloride and aluminum chloride, and iron or zinc dust are useful as catalysts in the reaction, and amounts somewhat less than 1% of the weight of benzotrichloride are usually sufficient. The distribution of the catalyst may be promoted by suspending it on an inert carrier presenting a large surface such as pumice or charcoal. When such catalysts are employed the reaction may be carried out at temperatures in the neighborhood of 100° to 120° C. The reaction may, however, be effected with water alone at higher temperatures and under pressure, e. g. at temperatures around 140° to 190° C. The catalysts above mentioned are also useful in the subsequent reaction with alcohol.

In carrying out the first part of the process of the invention, it is advantageous to employ an amount of water somewhat less than that theoretically required to form benzoyl chloride from the benzotrichloride, e. g., it is advantageous to employ from 90 to 95% of that amount. Likewise, in the second part of the present process, it is advantageous to employ an amount of alcohol somewhat in excess of the amount theoretically required to effect the conversion of the benzoyl chloride and to complete the conversion of the benzotrichloride to alkyl benzoate.

In the first part of the process, the water is added slowly, not substantially in excess of the rate at which it reacts, and agitation sufficient to disperse the water so that intimate contact is brought about between the water and the benzotrichloride, and the catalyst if one is employed, is maintained. After the addition of water is completed, the temperature is reduced and the alcohol is supplied to the reaction. Initially, it is advantageous to employ a reaction temperature of about 75° C. or somewhat less but the temperature may be allowed to rise toward the end of the alcohol reaction. The purity of the product is also promoted by decreasing the rate at which alcohol is added toward the end of the reaction. It is also advantageous to introduce the alcohol into the zone of maximum agitation, e. g., near the paddles if a mechanical stirrer is used. Methyl and ethyl alcohol are both useful in the process, forming the corresponding benzoates. When methyl alcohol is employed, it is advantageous to use a somewhat lower temperature during the reaction than is employed with ethyl alcohol.

The invention will be further illustrated by the following specific example, but it is intended and will be understood that the invention is illustrated thereby, but is not limited thereto:

650 lbs. of benzotrichloride, made by chlorinating toluene in light to a specific gravity of 1.37 to 1.38, are placed in a 100 gal. stoneware reactor, provided with a reflux condenser and means for maintaining thorough agitation and immersed in an oil bath. It is advantageous to preheat the benzotrichloride to about 90° to 100° C. and to run it into the reactor after the reactor has previously been heated to a corresponding temperature of about 90° to 100° C. The benzotrichloride may, however, be introduced into the cold reactor without preheating and then heated to the reaction temperature in the reactor. In the reactor, the temperature of the benzotrichloride is brought to about 110° to 115° C. and 3.5 lbs. of finely divided (50 mesh) anhydrous zinc chloride are added with the agitator in operation. 45 lbs. of water are then run in slowly. The first 9 lbs. of water are added over about 2 hours and the remaining 36 lbs. are added in about 1 hour more. The temperature throughout the reaction with water is maintained at about 110° to 115° C. After the water has all been added, the reaction mass is digested at about 110° for about 30 minutes, and is then cooled to about 70° to 90° C. and 123 lbs. of anhydrous methyl alcohol are added during the course of 3 to 4 hours. The rate of addition at first is fairly rapid, but toward the end of the reaction the rate at which the alcohol is added is decreased. During the addition of alcohol, the temperature is allowed to rise to about 95° to 100° C. toward the end of the reaction. After the alcohol has all been added, the methyl benzoate is washed once with 30 gals. of hot water and is then removed from the reactor. About 440 lbs. of crude methyl benzoate are obtained which on steam distillation over chalk yield about 370 lbs. of distilled product. Calcium benzoate equal to about 10 lbs. of benzoic acid is usually found in the residue from the steam distillation.

The distillation of the crude methyl benzoate produced as above described may be carried out in the presence of about 5% to 10% of chalk based on the weight of the crude product. The steam distilled product may then be hydrolyzed with a caustic alkali, such as caustic soda, for the production of the corresponding metallic benzoate. The residue from the steam distillation may be filtered while hot to recover the calcium benzoate from which the benzoic acid may be recovered by acidification with hydrochloric acid. Benzoic acid may also be produced from the metallic benzoates, produced as above described, by acidification.

The purity of the products of the process of this invention are somewhat dependent upon the purity of the benzotrichloride treated. Impurities in the benzotrichloride appear in the reaction products largely as tarry matter. The amount of tar formed during the operation of the process is higher with larger amounts of catalysts and at higher temperatures, but in order to obtain high yields of a good quality product the benzotrichloride itself should be of high quality. Such a high quality benzotrichloride can be produced by chlorinating toluene in light at 100° to 150° C. until the specific gravity is 1.375 to 1.385 at 20° C.

The process specifically described above, is believed to be the best method of carrying out the invention but the specific procedure described can be varied and the invention is not limited to these particular conditions. For example, the kind of catalyst used and the method of adding it to the reactor can be varied, as well as the method of adding the water and alcohol, whether as vapor or liquid, and the type of apparatus used. The temperatures employed may also be varied, as may be the methods of recovery and purification of the final products.

It will thus be seen that this invention provides an improved method for the production of benzoic acid and benzoates from benzotrichloride in which alkyl benzoates are formed as an intermediate product by the successive reaction upon benzotrichloride of water and alcohol.

I claim:

1. The method of producing alkyl benzoates, which comprises reacting upon benzotrichloride successively with water and with an alcohol, the amount of water employed being less than that theoretically required to form benzoyl chloride from the benzotrichloride.

2. The method of producing alkyl benzoates, which comprises reacting upon benzotrichloride successively with water and with an alcohol, the amount of water employed being less than that theoretically required to form benzoyl chloride from the benzotrichloride and the amount of alcohol employed being in excess of that theoretically required to effect the conversion of the benzoyl chloride and to complete the conversion of the benzotrichloride to the alkyl benzoate.

3. The method of producing alkyl benzoates, which comprises slowly adding an amount of water less than that theoretically required to form benzoyl chloride to benzotrichloride with agitation at a temperature of approximately 110°–115° C., and then slowly adding alcohol with agitation at a lower temperature to form the alkyl benzoate.

4. In the method of claim 3, decreasing the rate at which alcohol is added and increasing the temperature toward the end of the reaction.

5. In the method of claim 3, distilling the alkyl benzoate produced with steam over chalk.

6. The method of producing alkali metal benzoates which comprises causing benzotrichloride to react successively with less than the stochiometric equivalent of water required to form benzoyl chloride and with an aliphatic alcohol and hydrolyzing the alkyl benzoate product with an alkali metal hydroxide.

7. The method of producing a metallic salt of benzoic acid which comprises causing benzotrichloride to react successively with less than the stochiometric equivalent of water required to form benzoyl chloride and with an aliphatic alcohol and hydrolyzing the alkyl benzoate so produced with an alkaline compound of the metal.

8. The method of producing benzoic acid which comprises causing benzotrichloride to react successively with less than the stochiometric equivalent of water required to form benzoyl chloride and with an alkyl alcohol, hydrolyzing the alkyl benzoate so produced with an alkaline compound of a metal and finally acidifying the metallic benzoate so formed whereby benzoic acid is formed.

In testimony whereof I affix my signature.

ANTHONY GEORGE.